(12) United States Patent
Sauer et al.

(10) Patent No.: US 10,349,164 B2
(45) Date of Patent: Jul. 9, 2019

(54) MATERIAL FOR RAPID GAS SORPTION IN LOUDSPEAKERS

(71) Applicant: Nautilus Capital Corporation, Wilmington, DE (US)

(72) Inventors: Juergen Sauer, Munich (DE); Johannes Kobler, Munich (DE); Reimar Heinrich Leike, Munich (DE)

(73) Assignee: NAUTILUS CAPITAL CORPORATION, Wilmington, DE (US)

( * ) Notice: Subject to any disclaimer, the term of this patent is extended or adjusted under 35 U.S.C. 154(b) by 163 days.

(21) Appl. No.: 15/195,999

(22) Filed: Jun. 28, 2016

(65) Prior Publication Data

US 2017/0013350 A1  Jan. 12, 2017

(30) Foreign Application Priority Data

Jul. 7, 2015 (GB) .................................. 1511875.5

(51) Int. Cl.
  *B01D 53/02* (2006.01)
  *H04R 1/28* (2006.01)
  (Continued)

(52) U.S. Cl.
  CPC ........... *H04R 1/2803* (2013.01); *B01D 53/02* (2013.01); *B01D 53/0407* (2013.01); *B01J 20/18* (2013.01);
  (Continued)

(58) Field of Classification Search
  CPC ...... B01D 2253/108; B01D 2253/1085; B01D 2253/25; B01D 2253/302;
  (Continued)

(56) References Cited

U.S. PATENT DOCUMENTS 3,903,660 A  9/1975  Akins
3,909,531 A  9/1975  Plummer
(Continued)

FOREIGN PATENT DOCUMENTS

AU  2016289385 A1  1/2018
CN  106488365 A  3/2017
(Continued)

OTHER PUBLICATIONS

Juergen, Sauer, et al., United Kingdom Patent Office Combined Search and Examination Report (dated Jul. 26, 2016), Application No. GB1600709.8, Filed Jan. 14, 2016, 5 pages.
(Continued)

*Primary Examiner* — Christopher P Jones
(74) *Attorney, Agent, or Firm* — Womble Bond Dickinson (US) LLP (57) ABSTRACT

An assemblage of substantially round particles with a mean diameter between 0.1 and 4 mm, more preferable between 0.3 to 2 mm and most preferable between 0.8 to 1,2 mm, wherein the density of the assemblage determined by ISO 697 is between 250 kg/m3 and 400 kg/m3 is disclosed. The substantially round particles comprise at least one microporous material and optionally at least one binder, wherein the assemblage comprises a pore volume, wherein the pore volume comprises pores resulting from void space between different ones of the substantially round particles and pores within the substantially round particles.

20 Claims, 11 Drawing Sheets

(51) Int. Cl.
*B01J 20/18* (2006.01)
*B01J 20/28* (2006.01)
*B01J 20/30* (2006.01)
*B01D 53/04* (2006.01)
*B01J 20/26* (2006.01)
*H04R 31/00* (2006.01)

(52) U.S. Cl.
CPC ........... *B01J 20/183* (2013.01); *B01J 20/261* (2013.01); *B01J 20/2803* (2013.01); *B01J 20/28004* (2013.01); *B01J 20/2808* (2013.01); *B01J 20/28011* (2013.01); *B01J 20/28019* (2013.01); *B01J 20/28021* (2013.01); *B01J 20/28085* (2013.01); *B01J 20/305* (2013.01); *B01J 20/3042* (2013.01); *B01J 20/3078* (2013.01); *B01J 20/3092* (2013.01); *H04R 31/00* (2013.01); *B01D 2253/108* (2013.01); *B01D 2253/1085* (2013.01); *B01D 2253/25* (2013.01); *B01D 2253/302* (2013.01); *B01D 2253/308* (2013.01); *B01D 2253/311* (2013.01); *B01D 2253/34* (2013.01); *B01D 2257/102* (2013.01); *B01D 2257/104* (2013.01)

(58) Field of Classification Search
CPC ........ B01D 2253/308; B01D 2253/311; B01D 2253/34; B01D 2257/102; B01D 2257/104; B01D 53/02; B01D 53/0407; B01J 20/18; B01J 20/183; B01J 20/261; B01J 20/28004; B01J 20/28011; B01J 20/28019; B01J 20/28021; B01J 20/2803; B01J 20/2808; B01J 20/28085; B01J 20/3042; B01J 20/305; B01J 20/3078; B01J 20/3092; H04R 1/2803; H04R 31/00

See application file for complete search history.

(56) References Cited

U.S. PATENT DOCUMENTS

| | | |
|---|---|---|
| 4,101,736 A | 7/1978 | Czerwinski |
| 4,445,730 A | 5/1984 | Cross |
| 4,628,067 A | 12/1986 | Chen et al. |
| 4,637,990 A | 1/1987 | Torobin |
| 4,657,108 A | 4/1987 | Ward |
| 5,552,035 A | 9/1996 | Potter et al. |
| 6,210,625 B1 | 4/2001 | Matsushita et al. |
| 6,423,658 B1 | 7/2002 | Thonnelier et al. |
| 7,463,747 B2 | 12/2008 | Kuze et al. |
| 7,957,541 B2 | 6/2011 | Edgren et al. |
| 7,974,423 B2 | 7/2011 | Matsumura et al. |
| 8,184,826 B2 | 5/2012 | Matsumura et al. |
| 8,238,595 B2 | 8/2012 | Horowitz et al. |
| 8,565,463 B2 | 10/2013 | Saiki et al. |
| 8,649,506 B2 | 2/2014 | Dinh et al. |
| 8,687,836 B2 | 4/2014 | Lin |
| 8,767,998 B2 | 7/2014 | Imamura et al. |
| 8,794,373 B1 | 8/2014 | Lin |
| 8,848,960 B2 | 9/2014 | Yamazaki |
| 9,099,073 B2 | 8/2015 | Papakyriacou et al. |
| 9,615,165 B2 | 4/2017 | Herold et al. |
| 9,635,455 B2 | 4/2017 | Sch Ffmann et al. |
| 9,712,913 B2 | 7/2017 | Lembacher et al. |
| 9,723,400 B2 | 8/2017 | Herold et al. |
| 2007/0127760 A1 | 6/2007 | Saiki et al. |
| 2007/0165895 A1 | 7/2007 | Matsumura et al. |
| 2007/0286449 A1 | 12/2007 | Matsumura et al. |
| 2008/0135327 A1 | 6/2008 | Matsumura et al. |
| 2008/0170737 A1 | 7/2008 | Saiki et al. |
| 2009/0245562 A1 | 10/2009 | Saiki et al. |
| 2011/0085690 A1 | 4/2011 | Yamazaki |
| 2012/0027243 A1 | 2/2012 | Imamura et al. |
| 2013/0170687 A1 | 7/2013 | Papakyriacou et al. |
| 2013/0308812 A1 | 11/2013 | Shen |
| 2013/0314118 A1 | 11/2013 | Mak et al. |
| 2013/0341118 A1 | 12/2013 | Papakyriacou et al. |
| 2014/0037119 A1 | 2/2014 | Yuasa |
| 2014/0348349 A1 | 11/2014 | Nagaoka |
| 2016/0127821 A1 | 5/2016 | Bay |
| 2016/0345090 A1 | 11/2016 | Wilk et al. |
| 2017/0013350 A1 | 1/2017 | Sauer et al. |
| 2017/0064438 A1 | 3/2017 | Wilk et al. |
| 2017/0208386 A1 | 7/2017 | Yang et al. |

FOREIGN PATENT DOCUMENTS

| | | |
|---|---|---|
| CN | 107592973 A | 1/2018 |
| CN | 108025283 A | 5/2018 |
| DE | 112016003091 T5 | 5/2018 |
| EP | 0197776 | 10/1986 |
| EP | 1048345 | 11/2000 |
| EP | 1868410 A1 | 12/2007 |
| EP | 2003924 A1 | 12/2008 |
| FR | 2756196 | 5/1998 |
| GB | 2540160 A | 1/2017 |
| JP | H07144913 A | 6/1995 |
| JP | H111318 A | 1/1999 |
| JP | 2004089774 A | 3/2004 |
| JP | 2007288712 A | 11/2007 |
| JP | 2008535754 A | 9/2008 |
| KR | 10-2018-0054564 A | 5/2018 |
| WO | 2003/049849 | 6/2003 |
| WO | WO-03049849 | 6/2003 |
| WO | WO-2006103404 | 10/2006 |
| WO | WO2006/106854 A1 | 9/2008 |
| WO | 2012/025874 A1 | 3/2012 |
| WO | 2016/186717 A1 | 11/2016 |
| WO | 2017/007644 A1 | 1/2017 |

OTHER PUBLICATIONS

International Search Report and Written Opinion, dated Oct. 28, 2016, Application No. PCT/US2016/039911.
International Search Report and Written Opinion received for PCT Patent Application No. PCT/US2016/022975, dated May 12, 2016, 15 pages.
International Preliminary Report on Patentability received for PCT Patent Application No. PCT/US2016/039911, dated Jan. 18, 2018, 12 pages.
International Preliminary Report on Patentability received for PCT Patent Application No. PCT/US2016/022975, dated Nov. 30, 2017, 12 pages.
GB application # 1408816.5, entitled "Composite material and use in a loudspeaker device", filed on May 19, 2014.
United Kingdom Examination Report dated Sep. 25, 2018, for related United Kingdom Appln. No. GB1511875.5 3 Pages.
United Kingdom Examination Report dated Sep. 25, 2018, for related United Kingdom Appln. No. GB1600709.8 3 Pages.
Japanese Office Action dated Mar. 11, 2019 for related Japanese Appln. No. 2018-520380 3 Pages.

MATERIAL FOR RAPID GAS SORPTION IN LOUDSPEAKERS

This application claims the benefit of foreign priority of United Kingdom Patent Application No. 1511875.5 which was filed on Jul. 7, 2015; this application claims the benefit of the United Kingdom's filing date under 35 U.S.C. § 119 and is hereby incorporated herein by reference in its entirety.

FIELD OF THE INVENTION

The present invention relates to a material comprising an assemblage of highly spherical particles without protrusions and a specific porosity for fast gas sorption for the use in loudspeakers.

BACKGROUND OF THE INVENTION

As described in US20130170687A1 and U.S. Pat. No. 8,794,373B1 the application of an air-adsorbing structure in the closed cabinet (back volume) of a loudspeaker can significantly enhance the emission in the low frequency sound range. Molded paddings like granules or monoliths, consisting of hydrophobic zeolites with void spaces of a specific porosity have shown to be an especially suitable material.

The materials described in US20130170687A1 and U.S. Pat. No. 8,794,373B1 have several disadvantages. The 3D monolithic structure described in U.S. Pat. No. 8,687,836B1 has to be adapted to the geometry of the closed cabinet. This adaption might not be feasible, especially in the case of small and complex back volume geometries. Such small and complex back volume geometries are often found in mobile devices. It is thus more advantageous to fill these geometries with a granular material, such as that described in US20130170687A1 to be more flexible. However, irregular shaped granules with sharp edges possess a low flowability and can produce dust due to abrasion as e.g. described in WO1995018675A1.

In contrast to such irregular formed granules, spheres have a number of advantages. The spheres exhibit a higher degree of mechanical robustness, as described in (Krasii, B. V., V. B. Maryshev, and T. S. Kustova. "Comparison of mechanical strength of reforming catalysts of different geometry." Catalysis in Industry 1.4 (2009): 364-366. or US20100196213). The spheres do not contain sharp edges, which can lead to abrasion and dust formation as described in (ASTM D 4058-87, "Standard Test for Attrition and Abrasion of Catalysts and Catalyst Carriers") and show an enhanced flowability (no congestion during dosing—see e.g. U.S. Pat. No. 4,687,672). Furthermore, with monodisperse spheres, reproducible and dense packings with defined void spaces of a given volume are possible. In particular the ability of the spheres to fill irregular formed geometries is advantageous.

In the loudspeakers used in mobile devices, attrition and dust formation should be avoided. The dust of any inorganic material, such as zeolites, might be inhaled by the user of the mobile device and can be harmful to health. Such dust formation might not only be caused by the internal mechanical stress during regular operation of a loudspeaker, but also by external shocks and vibrations.

It will be understood therefore that there is a need for spherical particles with enhanced flowability for filling complex back volumes of a loudspeaker device, resulting in a mechanical robust, dust preventing and dense padding.

The disclosure teaches the synthesis of highly spherical particles with a defined porosity and a high abrasion resistance for use in loudspeakers.

DETAILED DESCRIPTION OF THE INVENTION

It will be known that gas diffusion into a sphere is reduced due to the minimized surface-to-volume ratio compared to other geometrical bodies with the same volume. A possible solution to increase the surface-to-volume ratio would be a reduction of the sphere diameter.

However, as described by the Kozeny-Carman equation, which is known by the expert in the art, a fixed bed comprising a plurality of spheres having a smaller diameter exhibit a higher pressure drop across the fixed bed than a fixed beds with spheres of a larger diameter. On the other hand, particularly in a loudspeaker, the pressure drop should be as low as possible across the fixed bed, since the fixed bed should be accessible in bulk to high variations in the pressure of sound wave. It would therefore be contradictory to reduce the sphere diameter too much. In other words, the spheres with a smaller diameter might hinder the sound waves travelling through the entire bed, thus leading, by effectively "flattening" pressure variations, to a reduction in the desired effect of virtually increasing the back volume.

This flattening effect has been confirmed in various experiments by the inventors. Two types of the spheres with two different diameters and comparable porosities were filled in the back cavity of the loudspeaker device. The electrical impedance as a function of frequency was measured. The results of the measurement are shown as plots in FIGS. 1A to 1C.

Figure 1:
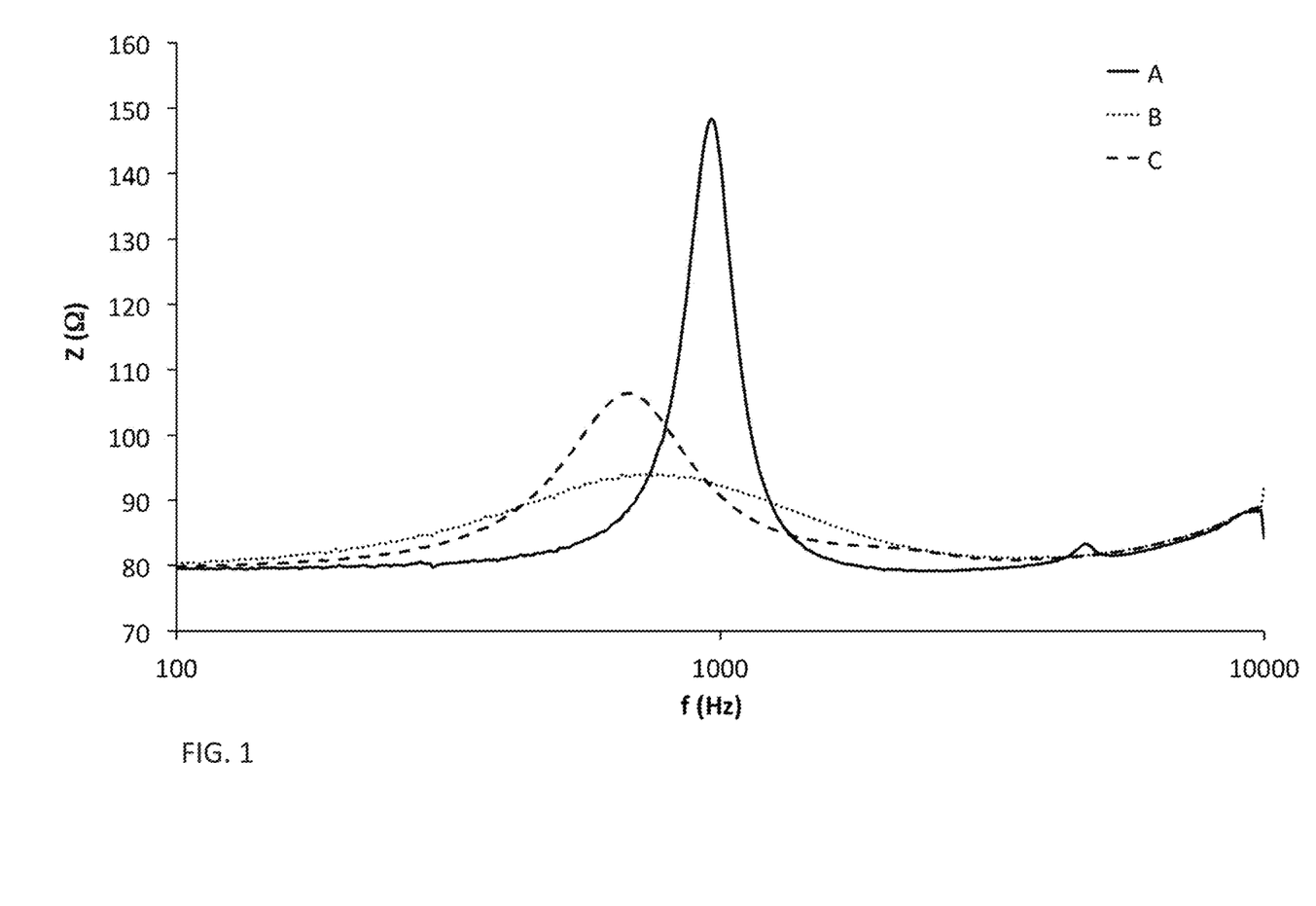
FIG. 1: Impedance curves recorded as described in example 5

FIG. 1 A was recorded with an empty cavity (no spheres), FIG. 1 B with the spheres of 0.4 mm diameter and FIG. 1 C with spheres of 1 mm. The spheres were synthesized as described in example 1 and 2 and exhibited the same internal porosity. The incorporation of the spheres resulted in a shift of a resonance frequency to lower values in both of the cases shown in FIGS. 1B and 1C. However, the resonance frequency shift was higher in the case of the bigger spheres and the dampening (broadening of the resonance peak) was lower. The diameter of the spheres should be kept as large as possible.

However, a larger sphere leads to higher diffusion path lengths inside an individual one of the spheres. Furthermore, the surface area in relation to the mass of a sphere to be accessed by intruding gas molecules is lowered. In order to compensate these negative effects on the accessibility of a sphere, it is desirable to control the porosity of the individual spheres and to introduce macropores within the spheres. Such macropores are also described e.g. in U.S. Pat. No. 8,794,373B1.

With traditional methods for the synthesis of zeolite spheres such as pan-coating (tablet-coating) or spheronization (marumerization) a control of the macroporosity is difficult to achieve. Such methods lead to a reduced sorption kinetic (hindered access for gas molecules) due to the densely packed surface, which is, for example, described in WO 2008/051904 A1. The hindered diffusion of the gas molecules and thus prolonged adsorption and desorption of the gas molecules make the manufacturing processes of WO 2008/051904 A1 unsuitable for the production of porous spheres with a specific porosity.

A well known, cost effective and versatile method to manufacture molded paddings with controlled porosity is "freeze-casting," also known as "ice-casting". An overview can be found in "Controlling Porosity and Pore Size Distribution in Green Ceramic Bodies via Freeze Casting Method" (D. Donchev, Ph.D. thesis, Martin-Luther-Universitaet Halle-Wittenberg, 2005). In this method, an aqueous slurry of a gel or a sol containing particles is frozen and subsequently freeze-dried. After evaporation of the ice at low temperatures via sublimation during the freeze-drying step, the removal of the ice crystals lead to channels and pores within the ceramic bodies. The freezing rate determines the size of the ice crystals, and thus the size of the channels and pores obtained in the final product.

Freezing droplets comprising a zeolite suspension and subsequent freeze-drying should thus lead to the desired material, e.g. spheres with a controllable porosity.

However it was not clear whether such a porous spherical material might be too soft and unstable because freeze-drying often leads to thin laminar structures, as described e.g. in (Mandal, Biman B., et al. "Laminar silk scaffolds for aligned tissue fabrication." Macromolecular bioscience 13.1 (2013): 48-58). The structures disclosed in this publication are described as being sensitive to mechanical strain. In particular, it was considered that the cohesion between laminar sheets is normally low.

The zeolite type used for adsorbing the gas particles (air) in the spheres was silicalite-1. Synthesis procedures of silicalite-1 are well known to a person skilled in the art and can be found e.g. in (Kalipcilar, H., and A. Culfaz. "Synthesis of Submicron Silicalite-1 Crystals from Clear Solutions." Crystal Research and Technology 35.8 (2000): 933-942.)

Production of monodispersed spherical droplets can, for example, be realized by nanodispensing (using a PipeJet P9 setup from Biofluidix GmbH) or an induced decay of a laminar fluid jet, as described by (Sakai, Takeshi, and Norimasa Hoshino. "Production of uniform droplets by longitudinal vibration of audio frequency." Journal of Chemical Engineering of Japan 13.4 (1980): 263-268.). The monodispersed spherical droplets generated by any method can be frozen, for example, directly in liquid nitrogen or during free fall in a cold gas atmosphere.

Figure 2:
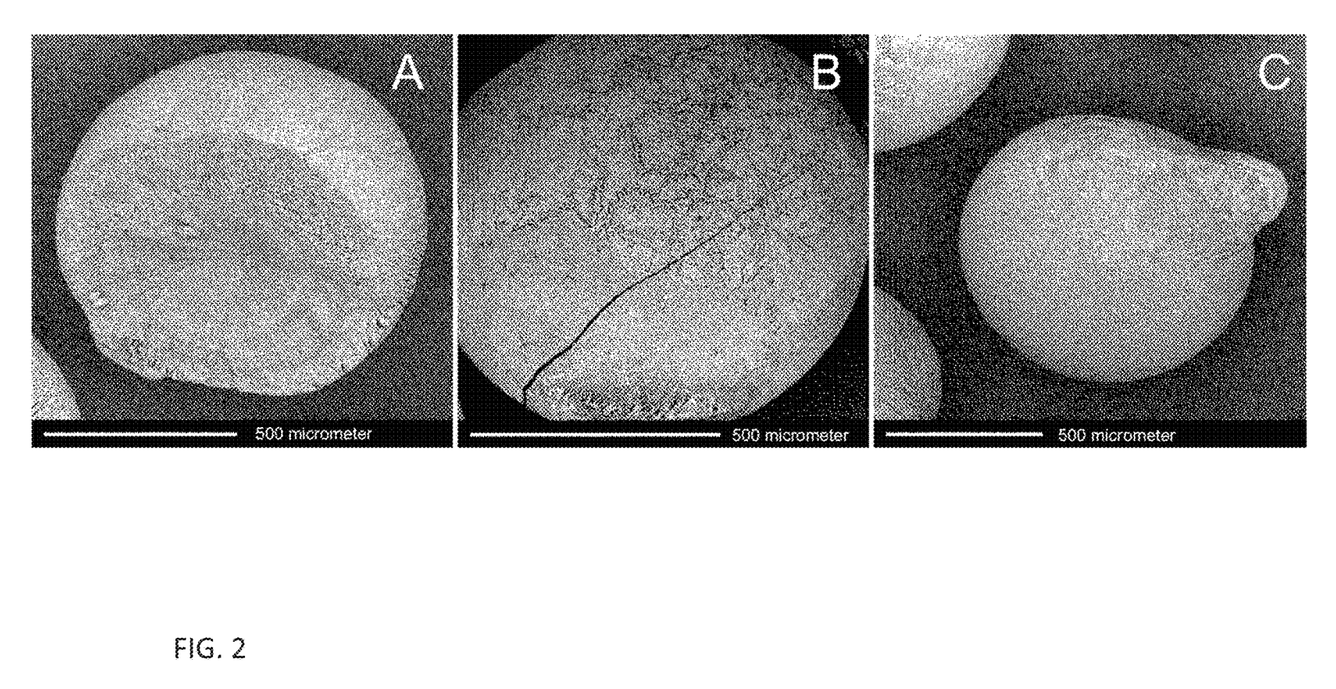
FIG. 2: SEM micrographs of particles produced as described in example 2

However, the freezing spherical droplets of aqueous suspensions of the zeolite particles with a small fraction of binder led to several problems, such as breaking or shattering of the spherical droplets (see FIG. 2 A). Most of the spheres produced by the method were imperfect due to the evolution of cracks (FIG. 2 B) or protrusions (FIG. 2 C) in or on the spheres.

These defects were also observed in freezing pure-water droplets in several publications, e.g. (Takahashi, C. "Deformation of frozen water drops and their frequencies." J. Meteor. Soc. Japan 53 (1975): 402-411.). As described by Johnson, D. A., and J. Hallett. "Freezing and shattering of supercooled water drops," Quarterly Journal of the Royal Meteorological Society 94.402 (1968): 468-482). The reason for these defects is the expansion of water during freezing. When freezing a (liquid) drop, a solid outer shell is initially formed. This ice capsule contains a liquid core, which expands during freezing and builds up an enormous pressure inside the sphere forming the ice capsule, thus leading to cracks, breaking or formation of protrusions.

Generally, the freezing process of a single drop is very complex and cannot be easily controlled since the freezing process is dependent on a variety of parameters, such as the thermal conductivity of a liquid or frozen fluid (such as a suspension of water, polymeric binder and zeolite), the heat transfer from the droplet to surroundings via a rotating or non-rotating droplet or convection currents within the droplet. The inventors could not completely explain when shattering or formation of protrusions occurs. However, the inventors observed an increasing number of non-spherical droplets with increasing size (volume) of the droplets (increasing volume-to-surface ratio).

The aforementioned defects, such as spikes, protrusions and cracks, lead to several disadvantages during production (e.g. deficient product) and in applications (e.g. flowability) of the beaded material. One disadvantage observed during usage of the beaded material is in a loudspeaker device. The degradation and attrition of the sharp edges, spikes or protrusions can lead to formation of dust, which might be harmful to the human lung. Such a dust formation should be avoided, especially for loudspeakers in hand-held devices.

Several approaches to minimize these defects, such as post-synthetic abrasion of sharp edges, variation of the viscosity of the initial suspension and freezing temperatures as well as times were explored by the inventors. The inventors ascertained that it was not possible to avoid the defects by the prior art techniques outlined above.

The injection of gas into the liquid droplets by means of a coaxial double nozzle should solve the described challenges, since a gas is much more compressible than a liquid. Thus, a small amount of gas preferably located in the center of a droplet should compensate the pressure built up during the freezing process. However, injection of the gas by known methods leads to rather thin walls of the liquid and a high volume of the enclosed gas in comparison with the total volume of the sphere, this is comparable to soap-bubbles. Such thin-walled bubbles would result in a minor fraction of zeolite particles in the final fixed bed, thus diminishing the effect of tapering pressure variations in the loudspeaker device.

Surprisingly it was found that the injection of small amounts of the gas is possible using an acoustic near field. The inventors have found that perfectly round, monodispersed and highly porous spheres with a high zeolite content are obtained by injecting a small amount of the gas via an acoustic near field into a laminar flow of a zeolite slurry, followed by freezing of the monodisperse droplets and subsequent freeze-drying. The use of these highly porous spheres without protrusions led to an acoustic air-adsorbing material with improved properties. This was unforeseeable and is despite the soft nature of the highly porous freeze-dried material. Compared with spheres containing protrusion, the probability of dust formation is lowered.

Figure 8:
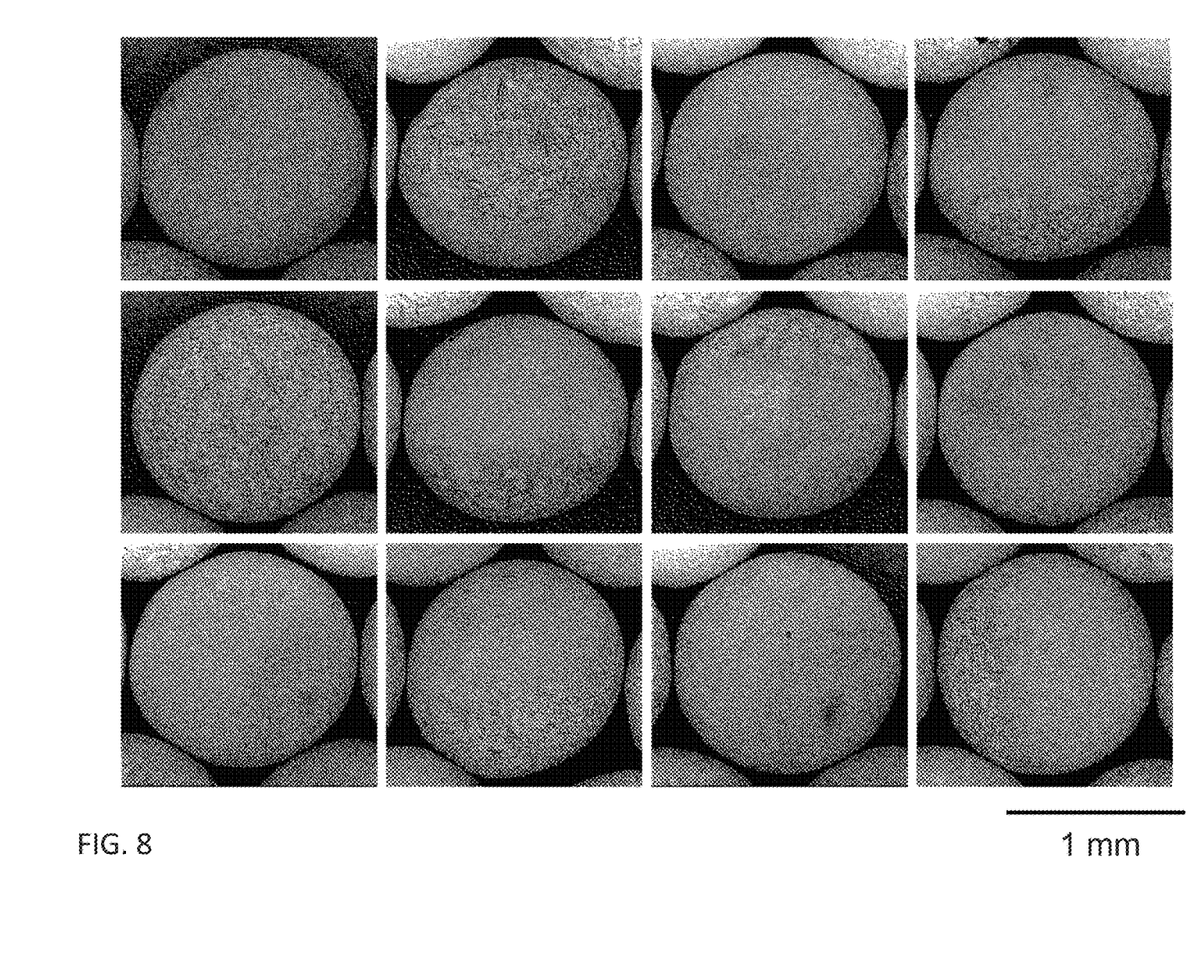
FIG. 8: Set of SEM micrographs of the spheres produced as described in example 4

If one of the round particles, as mentioned above, is spherical or not can be determined within a confidence interval by use of photographs or more preferable by scanning electron micrographs (SEM), as shown in FIG. 8. However, in a SEM micrograph, only about 50% of the surface of particles is visible. Thus, we assume one particle to be spherical with a probability of at least 50% if the following three conditions are fulfilled:

In the first condition the SEM-image of the particle is considered to be a 2-dimensional projection, although the SEM-image contains useful information about its 3-dimensional structure and morphology. The first condition will therefore be given as: I) If a particle is superimposed by a circle in a manner that the particle projection completely fills the circle and the circle has the maximum radius possible, the area of the particle projection outside the circle should be less than 20% of the area of the circle.

In the second condition, 3-dimensional information of the SEM is used. This second condition is as follows II: The Gaussian curvature of the entire surface visible in the micrograph must be positive on a length scale of 1/30th of the diameter of the perfect circle described in condition 1, meaning it cannot be distinguished from a surface with an exclusively positive Gaussian curvature with an optical resolution of 1/30th of the diameter of the perfect sphere described in condition 1.

The Gaussian curvature is defined by $K=1/r1 \times 1/r2$, in which r1 and r2 define the principal curvature. A negative Gaussian curvature refers to hyperbolic points, in which the surface is locally saddle-shaped.

In the third condition only the 2-dimensional information of the SEM micrograph is used. This third condition reads III) The outline of the projected particle area must be curved in a way that the center of each "circle of curvature" is situated inside the projection and never lies outside the projection on a length scale of 1/30th of the diameter of the circle in condition 1.

Figure 3:
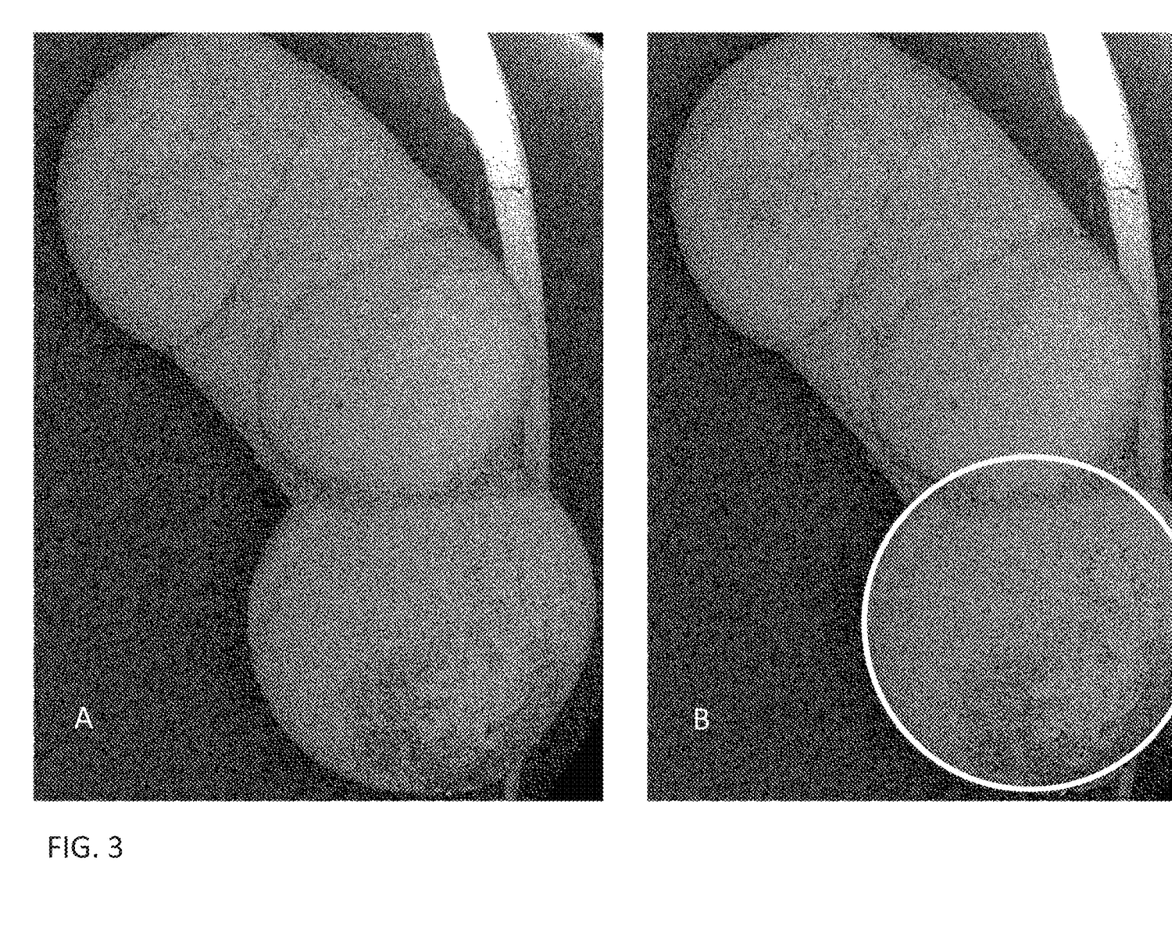
FIG. 3 and FIG. 4: SEM micrographs of particles produced as described in example 2 for roundness classification. The mean diameter is 1 mm.

FIG. 3 A shows an exemplary one of the particles. It is obvious that the area outside the inscribed circle in FIG. 3 B is much larger than 20% of the area of the inscribed circle. The particle is thus defined as non-spherical, as the particle does not fulfill condition I).

Figure 4:
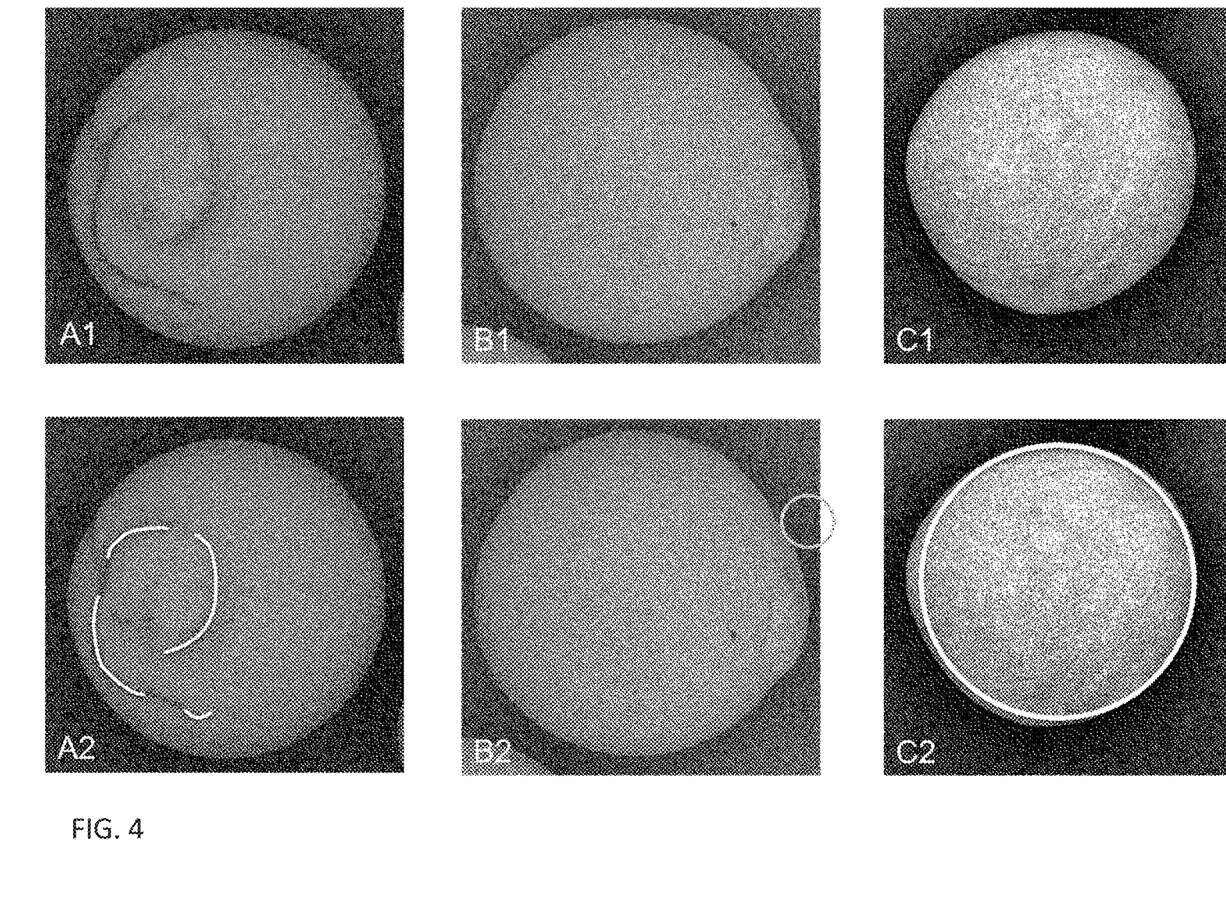

FIG. 4 A1 shows a particle with several visible saddle surfaces caused by a protrusion which points mainly in direction of the viewer. Some saddle surfaces are marked white in FIG. 4 A2. The particle is thus defined as non-spherical, as the particle does not fulfill condition II).

FIG. 4 B1 shows a particle, which projection allows drawing circles of curvature attached to its outline; the center of these circles lie outside the particle projection. One of these circles of curvature is shown in FIG. 4 B2. This particle is thus defined as non-spherical.

FIG. 4 C1 shows a particle which is defined as being spherical, despite the area outside of a circle drawn by the conditions defined in III) (FIG. 4 C2), because the area outside the circle is less than 20% of the whole area of the particle projection.

If all three conditions are fulfilled, the particle is considered to be spherical, with a probability of at least 50%.

An assemblage of particles is considered to work properly in the back volume of a loudspeaker device without generating too much dust if at least 75% of the particles are spherical as defined above.

An assemblage of particles is considered to exhibit 25% non-spherical particles within a given confidence interval if a control sample consisting of n particles shows a certain number of non-spherical particles. Since the probability of detection of a non-spherical particle is assumed to be 50%, the probabilities p is calculated by $$p = \binom{n}{z} \cdot 0.125^z \cdot 0.875^{(n-z)},$$

wherein n is the number of particles in the control sample and z is the number of observed non-spherical particles.

Examples for theoretical probabilities p (rounded to two digits) to observe z non-spherical particles in a sample of n particles consisting of 75% spherical and 25% non-spherical particles are given in the following table.

| For n = 10: | | | | | | | | | | | |
|---|---|---|---|---|---|---|---|---|---|---|---|
| z | 0 | 1 | 2 | 3 | 4 | 5 | 6 | 7 | 8 | 9 | 10 |
| p | 0.26 | 0.38 | 0.24 | 0.09 | 0.02 | 0 | 0 | 0 | 0 | 0 | 0 |
| For n = 100: | | | | | | | | | | | |
| z | 5 | 6 | 7 | 8 | 9 | 10 | 11 | 12 | 13 | 14 | 15 | 16 | 17 |
| p | 0.01 | 0.02 | 0.03 | 0.05 | 0.07 | 0.10 | 0.11 | 0.12 | 0.12 | 0.10 | 0.08 | 0.06 | 0.05 |
| z | 18 | 19 | 20 | 21 | 22 | 23 | 24 | 25 | 26 | 27 | 28 | 29 |
| p | 0.03 | 0.02 | 0.01 | 0.01 | 0.00 | 0.00 | 0.00 | 0.00 | 0.00 | 0.00 | 0.00 | 0.00 |

The probability to observe less than X or X non-spherical particles in a control sample of N particles of a batch with 25% non-spherical particles is thus given by $$p = \Sigma_{z=0}^{X} \binom{N}{z} \cdot 0.125^z \cdot 0.875^{(N-z)}.$$

The following table displays the probabilities p and 1-p for different values of X and N:

| N | X | p | 1 − p * 100 |
|---|---|---|---|
| 10 | 0 | 0.26 | 73.69 |
| 100 | 1 | 2.4E−5 | 99.998 |
| 100 | 2 | 1.6E−4 | 99.98 |
| 200 | 2 | 1.1E−9 | 99.9999999 |
| 200 | 4 | 7.9E−8 | 99.99999 |
| 200 | 6 | 2.2E−6 | 99.999 |

Take an example. If a control sample of 200 particles is examined, and if less than 7 particles (6, 5, 4, 3, 2, 1 or 0 particles) are non-spherical, the probability that the whole of the sample contains less than 25% non-spherical particles is at least 99.999%.

It can be advantageous to apply a monodisperse assemblage of particles, the term monodisperse as used in this disclosure refers to a collection of particles that are substantially of the same size, shape and mass.

The term microporous as used in this disclosure refers to pores with a diameter smaller than 2 nm. The term macroporous as used in this disclosure refers to pores with a diameter greater than 50 nm.

EXPERIMENTAL RESULTS

Example 1

40 g of zeolite silicalite-1 powder was dispersed in 30 g water using a high shear mixer to form a suspension. The pH of the suspension was adjusted to 9.5 using a 4 M solution of sodium hydroxide. 10 g of a polymeric binder (e.g. an alkaline water-based polyacrylate suspension with a solid content of 30%) was added and thoroughly mixed, resulting in a stable zeolite-polymer suspension. Homogenous droplets with a diameter of 0.4 mm of the suspension were produced using a PipeJet P9 (from the company Biofluidix) and directly frozen in liquid nitrogen after a falling distance of 30 cm in ambient air. After freezing, the spheres were freeze-dried under vacuum until the moisture content was below 3%. The volume of one sphere corresponds to appr. 34 nl.

Example 2

The same method as in Example 1 was chosen, however the diameter of drops was adjusted to 1 mm via dropping the suspension out of a capillary without a piezoactuator.

The volume of the drops was appr. 520 nl.

Example 3

Figure 5:
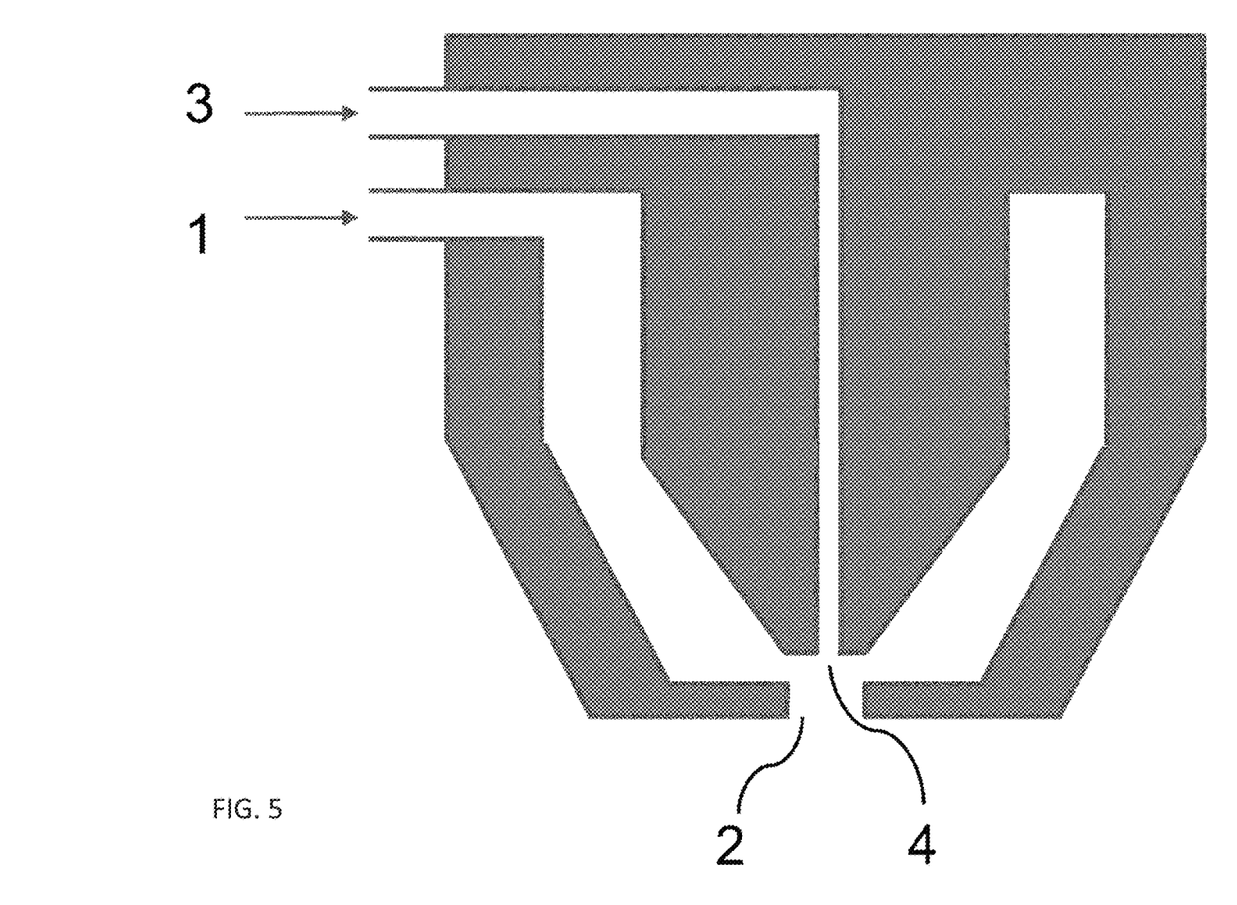
FIG. 5: Scheme of the double nozzle used in example 3

The stable zeolite-polymer suspension produced as described in example 1 was filled in a 250 ml pressurized glass vessel and connected to the shell inlet 1 of a concentric double nozzle (FIG. 5) with an outer nozzle 2 diameter of 0.6 mm. The pressure was increased using a high precision pressure controller in steps of 5 mbar until a stable laminar single jet of suspension was reached (flow: approximately 24 g/min). The inlet 3 of the core orifice 4 with a diameter of 0.1 mm was connected to the outlet 5 of a pressurized-air device (FIG. 6) with a high precision pressure controller connected to the inlet 6.

Figure 6:
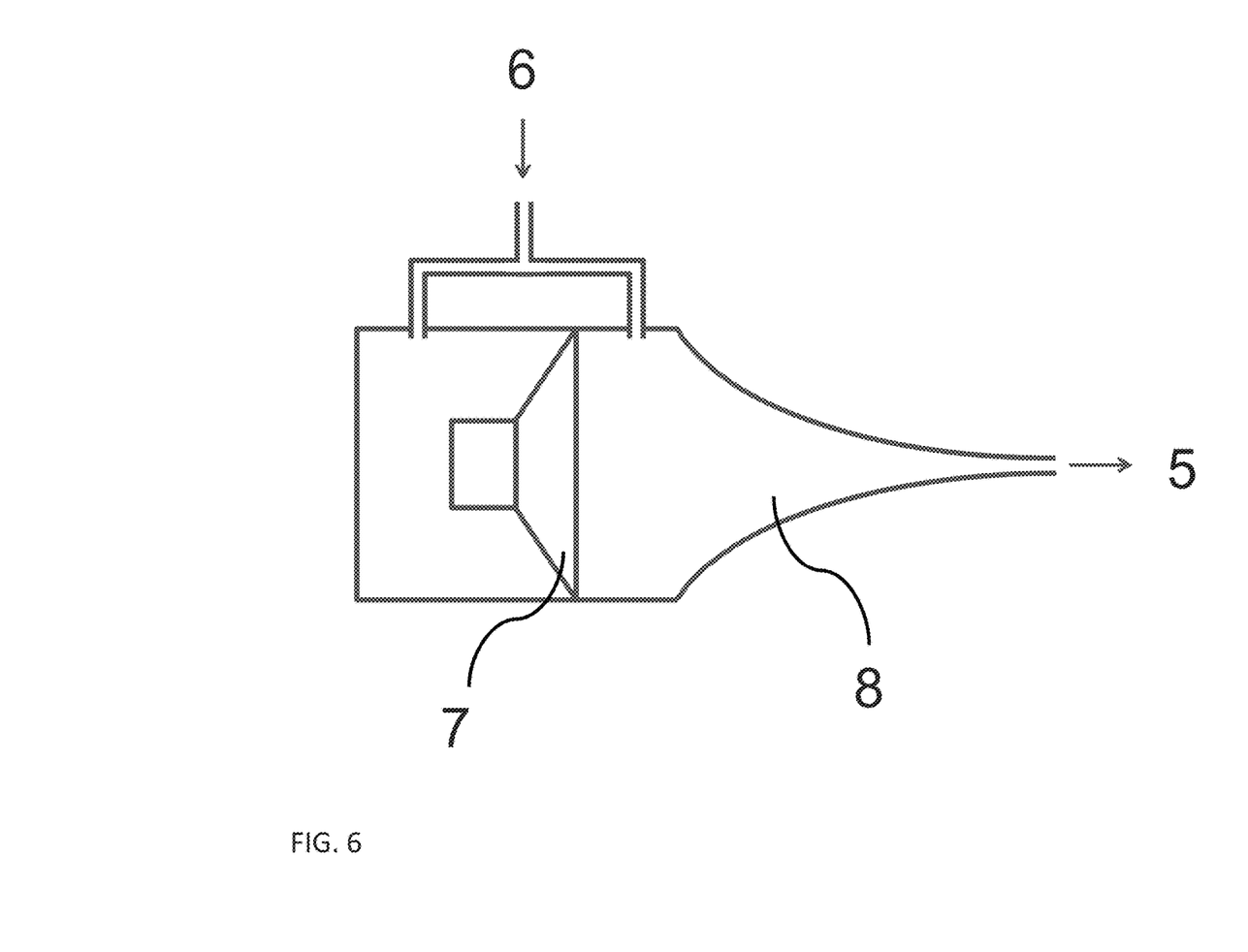
FIG. 6: Scheme of the pressurized-air device used in example 3

The air-pressure was increased until air was ejected from the inner nozzle 4 and destroyed the laminar flow of the jet of the suspension. In a second step, the air-pressure was reduced in 5 mbar steps until no air was ejected from the nozzle anymore and the jet was laminar again. The loudspeaker 7 was switched on and driven via a function generator with a sinus wave of varying frequency. The distance between the loudspeaker membrane and the core orifice 4 was less than 30 cm, thus within the nearfield of generated pressure waves of approx. 700 Hz. When the frequency of the loudspeaker 7 in the pressurized-air device with the exponential horn 8 matched the natural breakup frequency of the laminar liquid jet at about 700 Hz and the power was sufficiently high, individual droplets with a small gas-filled cavity were created. After passing a high voltage ring electrode (diameter: 2 cm, voltage: 3 kV) fanning out the aligned chain of droplets, the drops were frozen in liquid nitrogen like in example 1. The induced charge on their surface hindered the particles from combining in the liquid state while floating onto the liquid nitrogen. After complete freezing, the hollow spheres were freeze-dried under vacuum until the moisture content was 3% or below. The dry product was collected between two sieves (0.9 mm and 1.1 mm).

The amount of 100 ml of a filling of these particles determined by means of a Karg-Instrument Model ADP were weighed. The density was calculated to 310 kg/m3. The procedure is explained in detail in ISO 697.

Example 4

As described in example 3, but after passing a high voltage ring electrode the drops were frozen in a cylindrical cold gas container made of EPS with a height of 3 meters and a inner diameter of 60 cm that was cooled by spraying enough liquid nitrogen from the top into the container so that the temperature inside the container did not exceed −180° C. At the bottom of the container, the drops were collected in a liquid nitrogen bath. The frozen hollow spheres were freeze-dried and sieved as described in example 3.

Example 5

Measurement of the electrical impedance is a well-known method for a person skilled in the art. The size effect of particles is shown for a cylindrical back cavity with a high length-to-diameter aspect ratio of 10:1 together with a small loudspeaker that is commonly used in mobile devices. The spherical particles synthesised in example 1 and 2 with two different diameters were filled into a cylindrical back volume (0.5 ccm) with an inner diameter of 4 mm and a length of 40 mm. The measurement was performed using a setup e.g. as described for the program LIMP that can be found under http://www.artalabs.hr and in US20130170687A1. The material synthesized in example 2 and 4 were measured in a cubic backvolume (0.5 ccm).

DISCUSSION

The injection of a small gas filled cavity inside a droplet consisting of zeolite suspension has been described. It is assumed that the compressible gas volume inside the liquid sphere is able to level the pressure rise that is produced by the volume increase of the expanding ice shell growing towards the center of a sphere during freezing. The compressible gas is thus preventing the formation of protrusions (liquid suspension forced by expanding ice to leave the high pressure core) or breaking of the sphere. The injected gas volume might be even small enough so that the pressure increase compresses the cavity to such an extent that the final sphere appears solid without cavity. This can be understood in view of the ability of zeolite to adsorb increasing amounts of gas with increasing pressure.

As described in U.S. Pat. No. 4,671,909, the injection of air or gas into the center of a laminar liquid jet can lead to individual drops with included gas volume (bubbles). However, the object of the invention U.S. Pat. No. 4,671,909 is to use a coaxial nozzle to blow a dispersed particle film forming composition to form hollow green microspheres with uniform thin walls.

Using highly concentrated zeolite suspensions in the disclosed process of our invention did not lead to stable bubbles, probably because of these thin walls. Furthermore, in order to provide enough adsorption material, the walls should be—in contrast to U.S. Pat. No. 4,671,909—rather thick. The volume of the gas cavity should be less than 30% of the entire volume because a higher ratio of gas-volume to liquid-volume may not only lead to instable bubbles with thin walls, but would result in a high dead volume, e.g. unused space in the final packed bed in the back cavity of a loudspeaker device.

For adsorption processes in space-confined environments, such as the back cavity of a loudspeaker in mobile devices, the introduced gas volume therefore has to be sufficiently small in order to keep the void space in the back volume as low as possible and to guarantee a high loading with gas absorbing material, e.g. zeolite, respectively. Thus the challenge was to dramatically reduce the gas volume inside the sphere.

Surprisingly, sound waves in the near field allowed a significant reduction of the cavity-volume inside the sphere. The sound field helped to detach gas bubbles from the inner nozzle and made it possible to inject comparable small gas volumes into the laminar liquid jet, occupying less than 13% of the total volume of the sphere. The periodic release of the gas bubbles was adjusted to the natural breakup frequency of the laminar liquid jet resulting in monodispersed, individual hollow droplets with a single spherical gas-filled cavity.

It was found that the gas cavity was centered near the middle of the sphere and did not travel towards the surface or did not exit the sphere during the freezing process. This was a surprising result, since acceleration of the falling drop, for example when entering the cold nitrogen gas atmosphere with a higher density or by impacting the liquid nitrogen surface, was assumed to shift the position of the gas cavity. The term "acceleration" should be understand in the physical sense, e.g. as every change of a uniform motion, such as for example a slowdown or a change in direction.

The inventors of U.S. Pat. No. 4,279,632A state of the production of hollow spheres in a zero-gravity environment: "The body can be maintained in an environment of substantially zero gravity, to avoid tendencies for any gas within the spherical body to rise therein, and to help avoid distortions causes by the wind flowing past the body when it is in free fall in a 1 g gravity environment". The inventors of the current application were not able to explain whether stabilisation of the small gas bubble inside the drop might be supported by electrostatic repulsion effects or by a viscosity increase due to evaporation.

Figure 7:
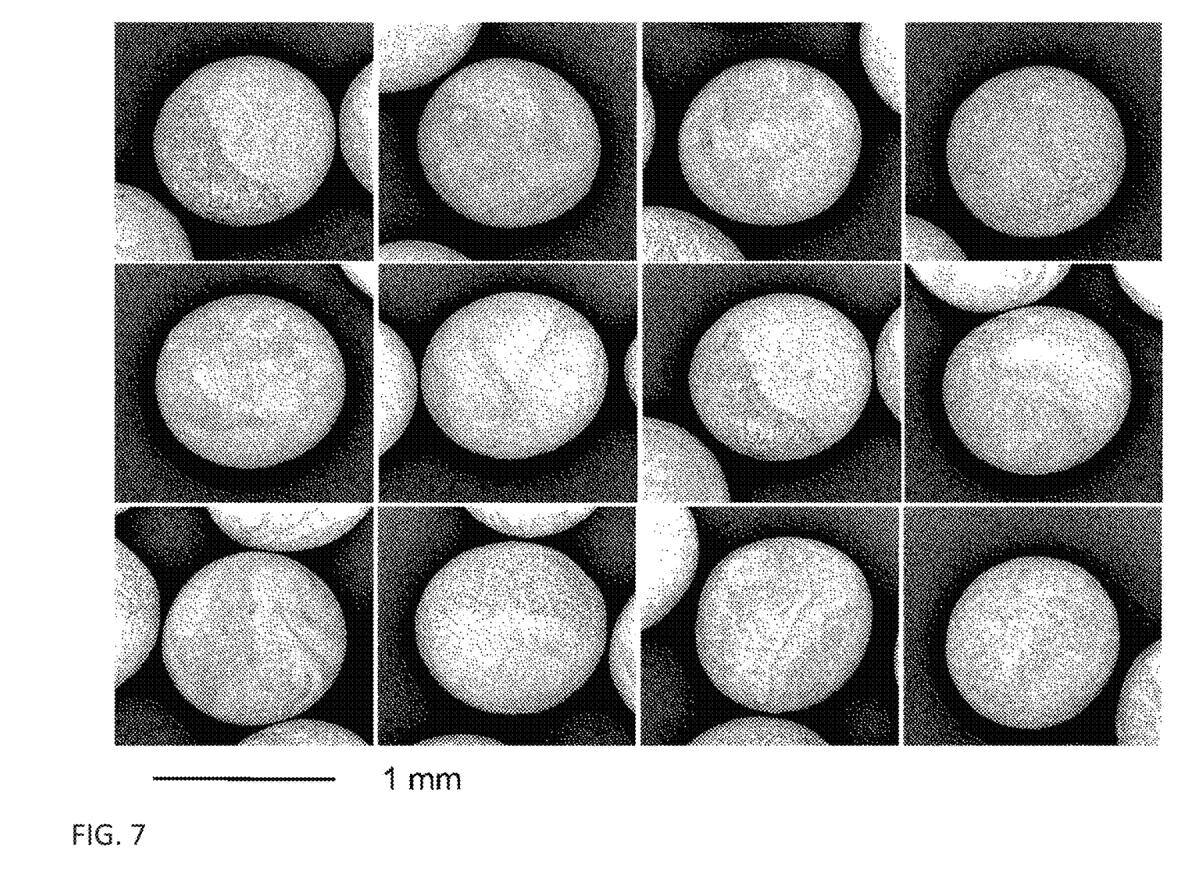
FIG. 7: Set of SEM micrographs of the spheres produced as described in example 3

It was not foreseeable that the freezing of the hollow droplets in liquid nitrogen would not destroy the hollow structure and even during drying in vacuum the hollow sphere did not break apart. Substantially round spheres (FIG. 7) without cracks or protrusions are obtained as the final products.

The acoustic performance of the material obtained by freezing droplets in liquid nitrogen needs to be improved. As found by mercury intrusion measurements, the pore system of the material was not ideal. Only a small volume of the total volume was in the range between 2 and 20 µm. Therefore, the freezing rate needed to be optimized, assuming that a lower freezing rate would lead to larger ice crystals and hence to larger pores.

Figure 9:
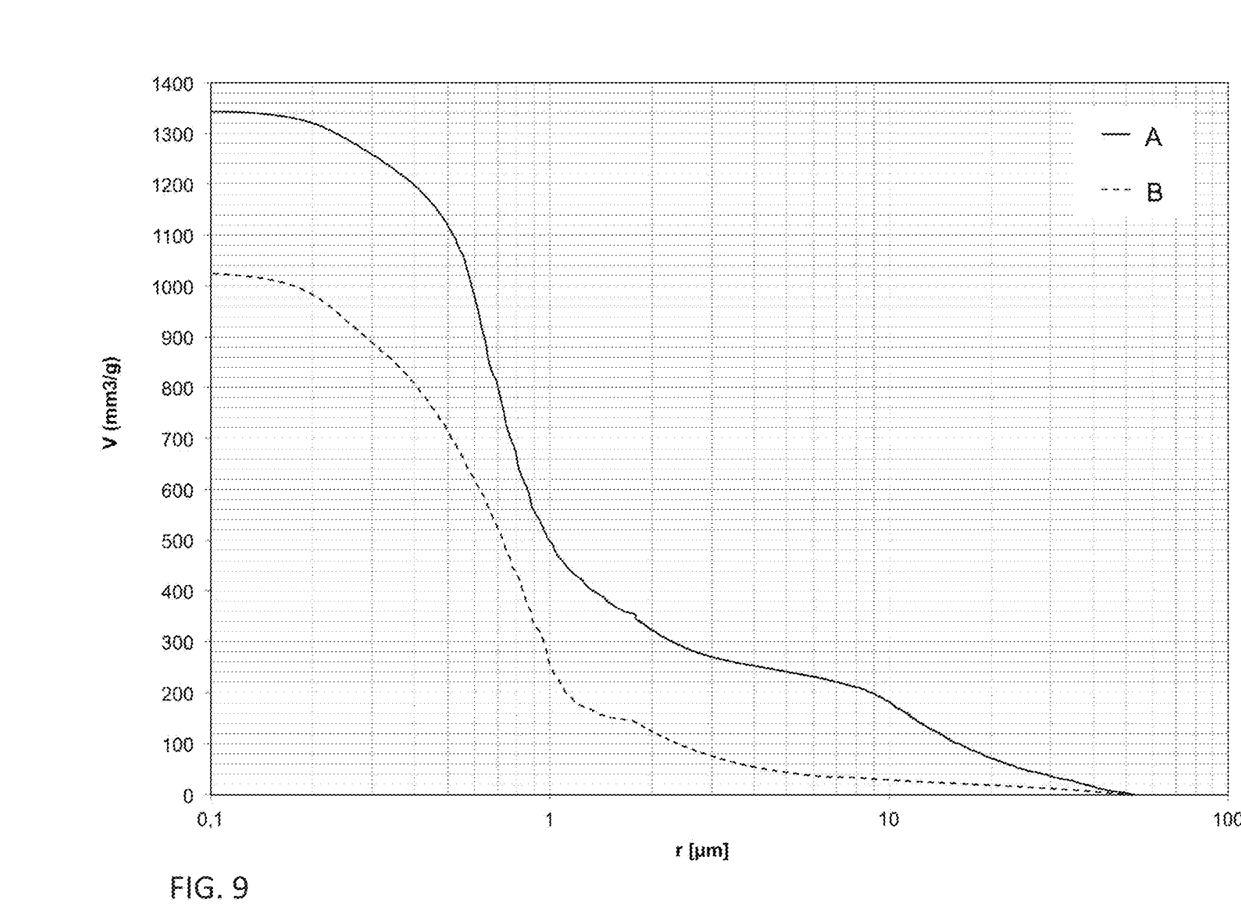
FIG. 9: Cumulative pore volume distribution measured by mercury intrusion
Figure 10:
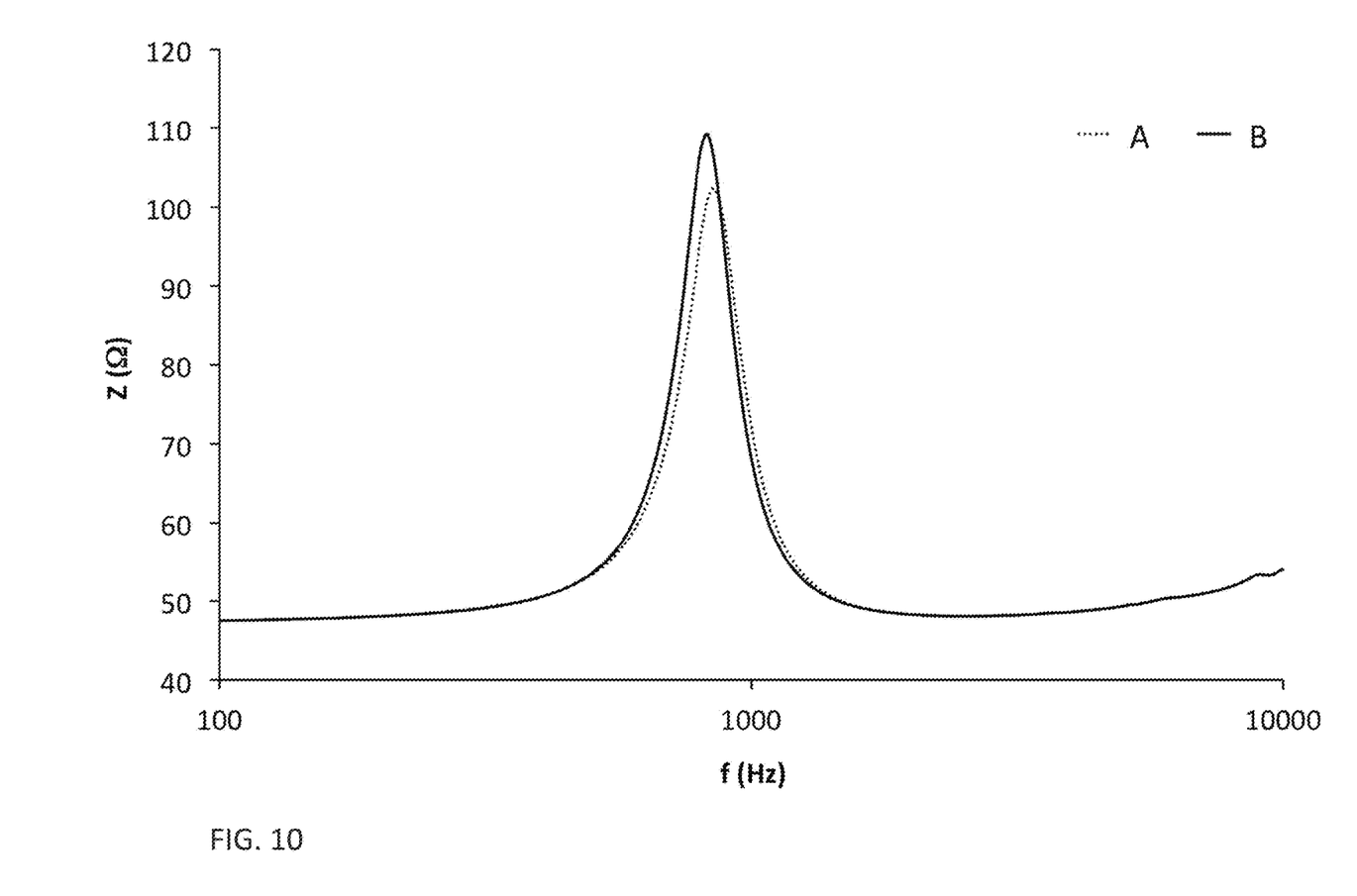
FIG. 10: Impedance curves of material synthesized in example 3 and 4 recorded as described in example 5

Example 4 describes a method for the production of spheres with an improved pore system. As shown in FIG. 8, the obtained spheres are similar to the ones in FIG. 7 and are also round and free of protrusions. However, as shown in FIG. 9 by mercury intrusion measurements, the percentage of macropores could be increased. The material obtained in example 4 exhibits 22% of its total pore volume as macropores in the range between 2 and 40 µm pore radius (FIG. 9 A) compared to 10% in the material obtained in example 3 (FIG. 9 B). The effect of this macroporosity on the acoustic performance of the materials is believed to be relevant, as shown in FIG. 10. The material of example 2 (FIG. 10 A) was compared to the material with improved porosity of example 4 (FIG. 10 B) by measuring the electrical impedance in a 0.5 ccm back cavity in a setup as described in example 5. The resonance frequency of the improved material is shifted to a lower frequency range.

It should be noted that the overall porosity in both materials from examples 3 and 4 is the same, since the same relation of water to zeolite and binder was chosen.

Figure 11:
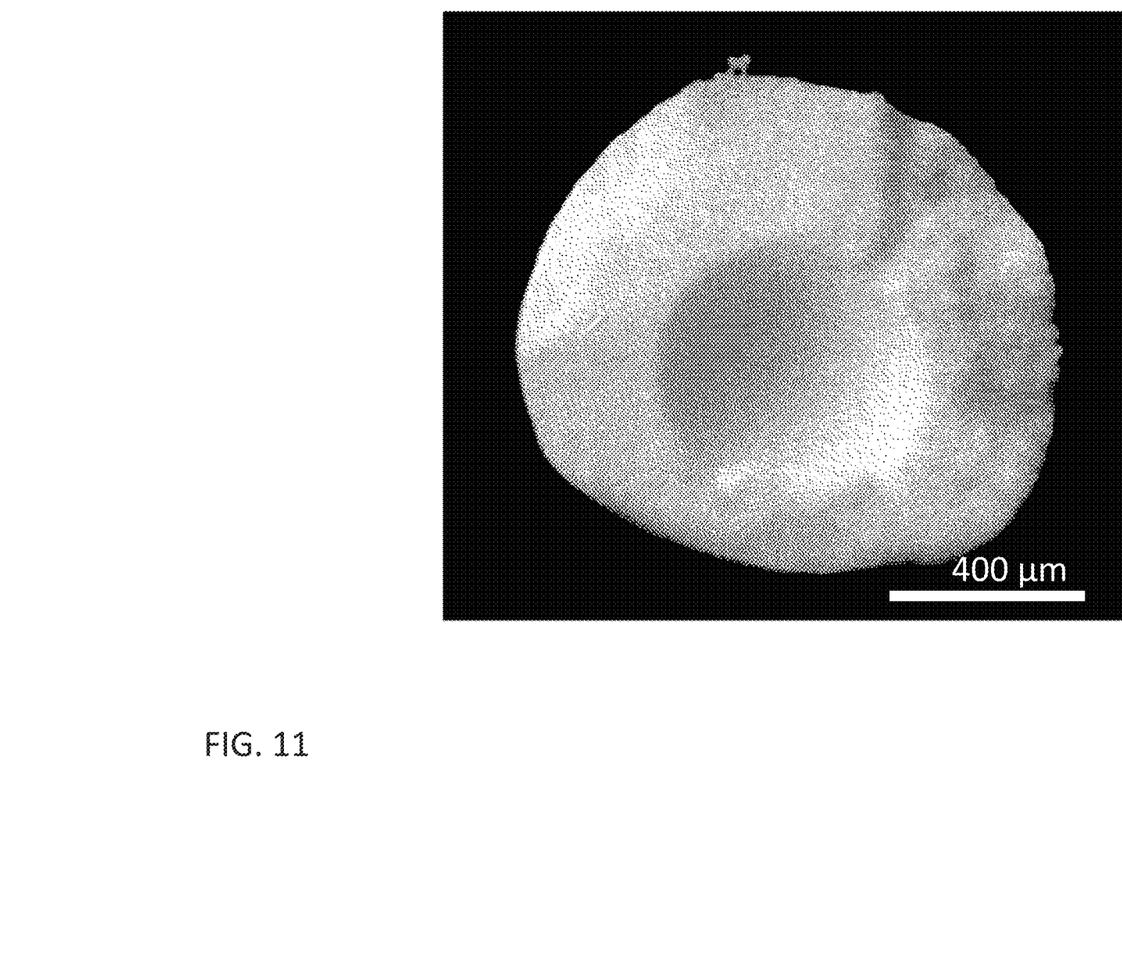
FIG. 11: Image of a fragmented sphere produced as described in example 4 showing the hollow core

After splitting the spheres by use of a sharp blade, the hollow nature of the particles can be seen in high magnification images (FIG. 11). The improved material showed no dust abrasion in the back cavity during filling and operation of the loudspeaker. Since the particle has an diameter of approximately 1000 µm, the cavity with an diameter of approximately 500 µm can be clearly seen if the optical resolution is at 1/30 of the particle diameter, e.g. at approximately 17 µm.

What is claimed is:

1. An assemblage of substantially spherical particles with a mean diameter between 0.1 and 4 mm wherein:
    the density of the assemblage determined by ISO 697 is between 250 kg/m$^3$ and 400 kg/m$^3$,
    the substantially spherical particles comprise at least one microporous zeolite material and optionally at least one binder,
    the assemblage comprises a pore volume comprising pores resulting from void space between different ones of the substantially spherical particles and pores within the substantially spherical particles, and
    wherein at least one of the substantially spherical particles contains at least one central inside cavity within the substantially spherical particle, wherein the at least one central cavity occupies at least 3% and not more than 50% of the substantially spherical particle by volume.

2. The assemblage of claim 1, wherein the pores have different radii, and wherein, if the pore volume has pores larger than 0.002 µm and smaller than 100 µm in diameter, at least 25% of the pore volume is comprised by pores having radii between 0.4 and 90 µm.

3. The assemblage of claim 1, wherein the assemblage is substantially monodisperse.

4. The assemblage of claim 1 wherein the microporous material are purely inorganic.

5. The assemblage of claim 1 wherein the zeolites are hydrophobic zeolites, the hydrophobic zeolites being zeolites adsorbing less than 5% (of their mass) water in a National Institute of Standards of Technology (NIST) standard temperature and pressure (STP) atmosphere with a relative humidity between 30% and 99%.

6. The assemblage of claim 1, wherein the substantially spherical particles are dielectrics.

7. An electrical device comprising:
    a loudspeaker including a back volume;
    an assemblage of substantially spherical particles positioned in the back volume;
    wherein the substantially spherical particles have a mean diameter between 0.1 and 4 mm,
    wherein the density of the assemblage determined by ISO 697 is between 250 kg/m$^3$ and 400 kg/m$^3$,
    wherein the substantially spherical particles comprise at least one microporous zeolite material and optionally at least one binder, wherein the assemblage comprises a pore volume, and wherein the pore volume comprises pores resulting from void space between different ones of the substantially spherical particles and pores within the substantially spherical particles, and wherein at least one of the substantially spherical particles contains at least one central inside cavity within the substantially spherical particle, wherein the at least one central cavity occupies at least 3% and not more than 50% of the substantially spherical particle by volume.

8. The electrical device of claim 7, wherein the pores have different radii, and wherein, if the pore volume has pores larger than 0.002 μm and smaller than 100 μm in diameter, at least 25% of the pore volume is comprised by pores having radii between 0.4 and 90 μm.

9. The electrical device of claim 7, wherein the assemblage is substantially monodisperse.

10. The electrical device of claim 7 wherein the microporous material are purely inorganic.

11. The electrical device of claim 7 wherein the zeolites are hydrophobic zeolites, the hydrophobic zeolites being zeolites adsorbing less than 5% (of their mass) water in a National Institute of Standards and Technology (NIST) standard temperature and pressure (STP) atmosphere with a relative humidity between 30% and 99%.

12. The electrical device of claim 7, wherein the substantially spherical particles are dielectrics.

13. The assemblage of claim 1 wherein the mean diameter of the spherical particles is between 0.3 mm and 2 mm.

14. The assemblage of claim 13 wherein the mean diameter of the spherical particles is between 0.8 mm and 1.2 mm.

15. The electrical device of claim 7 wherein the mean diameter of the spherical particles in the assemblage is between 0.3 mm and 2 mm.

16. The electrical device of claim 15 wherein the mean diameter of the spherical particles in the assemblage is between 0.8 mm and 1.2 mm.

17. The assemblage of claim 1 wherein at least 25% of the pore volume is comprised by pores having radii between 1 and 40 pm.

18. The assemblage of claim 17 wherein at least 25% of the pore volume is comprised by pores having radii between 2 and 20 μm.

19. The electrical device of claim 8 wherein at least 25% of the pore volume is comprised by pores having radii between 1 and 40 μm.

20. The electrical device of claim 19 wherein at least 25% of the pore volume is comprised by pores having radii between 2 and 20 μm.

* * * * *